United States Patent
Liao et al.

(10) Patent No.: US 9,946,264 B2
(45) Date of Patent: Apr. 17, 2018

(54) AUTONOMOUS NAVIGATION USING VISUAL ODOMETRY

(71) Applicant: Sharp Laboratories of America, Inc., Camas, WA (US)

(72) Inventors: Miao Liao, Camas, WA (US); Ming Li, Camas, WA (US); Soonhac Hong, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 51 days.

(21) Appl. No.: 15/076,745

(22) Filed: Mar. 22, 2016

(65) Prior Publication Data

US 2017/0277197 A1  Sep. 28, 2017

(51) Int. Cl.
| | |
|---|---|
| *G05D 1/02* | (2006.01) |
| *G06K 9/00* | (2006.01) |
| *G06T 7/00* | (2017.01) |
| *G06T 7/20* | (2017.01) |

(Continued)

(52) U.S. Cl.
CPC ....... *G05D 1/0251* (2013.01); *G06K 9/00805* (2013.01); *G06K 9/6211* (2013.01); *G06T 7/002* (2013.01); *G06T 7/0075* (2013.01); *G06T 7/20* (2013.01); *H04L 12/40* (2013.01); *H04L 12/40013* (2013.01); *G05D 2201/0213* (2013.01); *G06T 2207/20228* (2013.01);

(Continued)

(58) Field of Classification Search
CPC .......... G05D 1/0251; G05D 2201/0213; G06T 7/20; G06T 7/0075; G06T 7/002; G06T 2207/20228; G06T 2207/30261; G06K 9/00805; H04L 12/40; H04L 2012/40273
See application file for complete search history.

(56) References Cited

U.S. PATENT DOCUMENTS

| | | | |
|---|---|---|---|
| 7,248,968 B2 | 7/2007 | Reid | |
| 7,925,049 B2 * | 4/2011 | Zhu | G06K 9/32 382/103 |
| 2007/0288141 A1 | 12/2007 | Bergen et al. | |

(Continued)

OTHER PUBLICATIONS

Pink et al. "Visual Features for Vehicle Localization and Ego-Motion Estimation", IEEE. archived Oct. 5, 2011.*

*Primary Examiner* — Mussa A Shaawat
*Assistant Examiner* — Michael V Kerrigan
(74) *Attorney, Agent, or Firm* — ScienBiziP, P.C.; Steve Reiss

(57) ABSTRACT

A system and method are provided for autonomously navigating a vehicle. The method captures a sequence of image pairs using a stereo camera. A navigation application stores a vehicle pose (history of vehicle position). The application detects a plurality of matching feature points in a first matching image pair, and determines a plurality of corresponding object points in three-dimensional (3D) space from the first image pair. A plurality of feature points are tracked from the first image pair to a second image pair, and the plurality of corresponding object points in 3D space are determined from the second image pair. From this, a vehicle pose transformation is calculated using the object points from the first and second image pairs. The rotation angle and translation are determined from the vehicle pose transformation. If the rotation angle or translation exceed a minimum threshold, the stored vehicle pose is updated.

18 Claims, 6 Drawing Sheets

(51) Int. Cl.
 *H04L 12/40* (2006.01)
 *G06K 9/62* (2006.01)

(52) U.S. Cl.
 CPC ............... *G06T 2207/30261* (2013.01); *H04L 2012/40273* (2013.01)

(56) References Cited

U.S. PATENT DOCUMENTS

2008/0294288 A1   11/2008  Yamauchi
2012/0253582 A1   10/2012  Chrysanthakopoulos et al.
2016/0026184 A1*   1/2016  Stainvas Olshansky
 ............................ G01S 17/936
 356/4.01

\* cited by examiner

AUTONOMOUS NAVIGATION USING VISUAL ODOMETRY

BACKGROUND OF THE INVENTION

1. Field of the Invention

This invention generally relates to visual odometry and, more particularly, to a system and method for using visual odometry to autonomously navigate a vehicle.

2. Description of the Related Art

In navigation, odometry is the use of data from the movement of actuators to estimate change in position over time through devices such as rotary encoders to measure wheel rotations. Visual odometry is the process of determining equivalent odometry information using sequential camera images to estimate the distance traveled. Many existing approaches to visual odometry are based on the following stages:

1) Acquire input images: using either single, stereo, or omnidirectional cameras.
2) Image correction: apply image processing techniques for lens distortion removal, etc.
3) Feature detection: define interest operators, and match features across frames and construct optical flow field.
4) Use correlation to establish correspondence of two images, extract features, and correlate.
5) Check flow field vectors for potential tracking errors and remove outliers.
6) Estimation of the camera motion from the optical flow.
7) Find the geometric and 3D properties of the features that minimize a cost function based on the re-projection error between two adjacent images.
8) Periodic repopulation of trackpoints to maintain coverage across the image.

Egomotion is defined as the 3D motion of a camera within an environment. In the field of computer vision, egomotion refers to estimating a camera's motion relative to a rigid scene. An example of egomotion estimation would be estimating a car's moving position relative to lines on the road or street signs being observed from the car itself. The goal of estimating the egomotion of a camera is to determine the 3D motion of that camera within the environment using a sequence of images taken by the camera. The process of estimating a camera's motion within an environment involves the use of visual odometry techniques on a sequence of images captured by the moving camera. As noted above, this may be done using feature detection to construct an optical flow from two image frames in a sequence generated from either single cameras or stereo cameras. Using stereo image pairs for each frame helps reduce error and provides additional depth and scale information.

In conventional stereo vision, two cameras, displaced horizontally from one another, are used to obtain two differing views of a scene, in a manner similar to human binocular vision. By comparing these two images, the relative depth information can be obtained, in the form of disparities, which are inversely proportional to the differences in distance to the objects. In conventional camera systems several pre-processing steps are required.

1) The image must first be removed of distortions, such as barrel distortion to ensure that the observed image is purely projectional.
2) The image must be projected back to a common plane to allow comparison of the image pairs, known as image rectification.
3) An information measure which compares the two images is minimized. This gives the best estimate of the position of features in the two images, and creates a disparity map.
4) Optionally, the disparity as observed by the common projection is converted back to the depth map by inversion. Utilizing the correct proportionality constant, the depth map can be calibrated to provide exact distances.

Stereo vision uses triangulation based on epipolar geometry to determine the distance to an object. More specifically, binocular disparity is the process of relating the depth of an object to its change in position when viewed from a different camera, given the relative position of each camera is known. With multiple cameras it can be difficult to find a corresponding point viewed by one camera in the image of the other camera. In most camera configurations, finding correspondences requires a search in two-dimensions. However, if the two cameras are aligned correctly to be coplanar, the search is simplified to one dimension—a horizontal line parallel to the line between the cameras. Furthermore, if the location of a point in the left image is known, it can be searched for in the right image by searching left of this location along the line, and vice versa.

The disparity of features between two stereo images is usually computed as a shift to the left of an image feature when viewed in the right image. For example, a single point that appears at the x coordinate t (measured in pixels) in the left image may be present at the x coordinate t−3 in the right image. In this case, the disparity at that location in the right image would be 3 pixels.

Knowledge of disparity can be used in further extraction of information from stereo images. One case in which disparity is most useful is for depth/distance calculation. Disparity and distance from the cameras are inversely related. As the distance from the cameras increases, the disparity decreases. This allows for depth perception in stereo images. Using geometry and algebra, the points that appear in the 2D stereo images can be mapped as coordinates in 3D space. This concept is particularly useful for navigation.

In mathematics, a rigid transformation (isometry) of a vector space preserves distances between every pair of points. Rigid transformations of a plane $R^2$, space $R^3$, or real n-dimensional space $R^n$ are termed a Euclidean transformation because they form the basis of Euclidean geometry. The rigid transformations include rotations, translations, reflections, or their combination. In general, any proper rigid transformation can be decomposed as a rotation followed by a translation. Objects keep the same shape and size after a proper rigid transformation.

In Euclidean geometry, a translation is a function that moves every point a constant distance in a specified direction. A translation can be described as a rigid motion: other rigid motions include rotations and reflections. A translation can also be interpreted as the addition of a constant vector to every point, or as shifting the origin of the coordinate system. A rotation is a motion of a certain space that preserves at least one point. It can describe, for example, the motion of a rigid body around a fixed point. A rotation is different from a translation, which has no fixed points.

Currently, most autonomous robot navigation systems are implemented based on high end sensors, such as a laser scanner, high accuracy GPS receiver, or orientation sensor (inertia measurement unit (IMU)). These sensors add to the cost of the robots, making them unaffordable for household applications.

It would be advantageous if a low cost alternative to robot auto navigation existing using visual odometry, to aid with obstacle avoidance.

SUMMARY OF THE INVENTION

Disclosed herein is a robot autonomous navigation system based on the following three technologies:

Stereo based visual odometry navigation. With the help of three-dimensional (3D) perception capability of stereo cameras, the 3D positions of scene points are tracked as robot moves. The transformation of those 3D scene points is computed and represented as a rotation and translation matrices. The robot movement can be computed by simply inversing the rotation and translation of the scene points. By accumulating robot movements between time intervals, the robot pose is found.

Stereo based obstacle detection. A dense depth map is built for a pair of left and right images captured at the same point in time. Then, the depth map is back-projected into 3D space followed by the removal of the ground plane. The remaining 3D points are those objects above ground. Those points are projected onto a 2D grid defined on the ground plane and clustered into individual obstacles.

An obstacle avoidance algorithm that enables a robot to find a safe path around or between obstacles and resume its path to a goal point.

Unlike conventional systems, the navigation system is enabled with only a stereo camera as a sensor. Compared to conventional robot navigation systems that employ multiple sensors to accomplish the same task, the system using stereo vision sensor significantly reduces the cost of autonomous navigation.

Accordingly, a method is provided for autonomously navigating a vehicle. The method captures a sequence of image pairs using a stereo camera. A navigation application embedded in a non-transitory memory as a sequence of processor executable instructions stores a vehicle pose, where a vehicle pose is defined herein as a position and orientation with respect to a coordination frame. The application detects a plurality of matching feature points in a first matching image pair, and determines a plurality of corresponding object points in 3D space from the first image pair. A plurality of feature points are tracked from the first image pair to a second image pair, and the plurality of corresponding object points in 3D space are determined from the second image pair. From this, a vehicle pose transformation is calculated using the object points from the first and second image pairs. The rotation angle and translation are determined from the vehicle pose transformation. If the rotation angle or translation exceed a minimum threshold, the stored vehicle pose is updated.

By only updating the stored vehicle pose when the rotation angle or translation exceed the minimum threshold, the accumulation of errors is minimized in vehicle pose transformations calculated between image pairs. If the rotation angle and translation do not exceed the minimum threshold, the vehicle transformation is discarded.

In one aspect, the vehicle pose is converted into a world coordinate system having a ground plane. Using a plane model, a dominant plane in the 3D space is found that fits the maximum number of points in an initial image frame, and the dominant plane is defined as an estimated ground plane in the world coordinate system. Using the estimated ground plane, the vehicle camera height can be determined with respect to the estimated ground plane, and camera pitch can be determined with respect to the estimated ground plane. As the vehicle changes position, the estimated ground plane is continuously redefined over a plurality of sequential image pairs, which continuously redetermines the camera height and the camera pitch. As a result of redetermining the camera height and camera pitch, a changing ground plane slope does not become defined as an obstacle. Otherwise, after removing all points on the estimated ground plane from the 3D space, all remaining point in the 3D space are defined as potential obstacles.

Additional details of the above-described method and a system for autonomous navigation are provided below.

DETAILED DESCRIPTION

Figure 1:
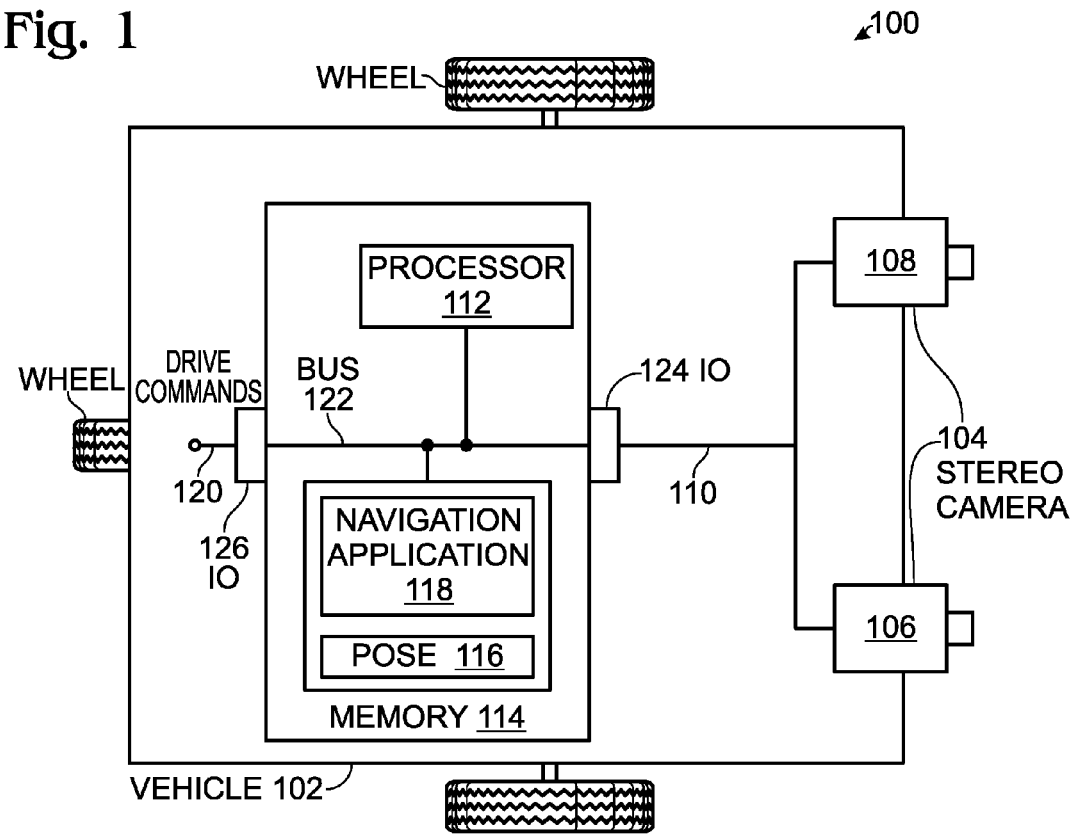
FIG. 1 is a schematic block diagram of a system for autonomously navigating a vehicle.

FIG. 1 is a schematic block diagram of a system for autonomously navigating a vehicle. The system 100 comprises a vehicle (robot) 102. A stereo camera 104, with a right camera 106 and a left camera 108, is mounted on the vehicle 102 and has an output on line 110 to supply image pairs. Each image pair includes a right image and a left image. The system 100 further comprises a processor 112 and a non-transitory memory 114. Residing in memory 114 is a stored vehicle pose 116, where a vehicle pose is defined herein as a position and orientation with respect to a coordinate frame. As described in more detail below, the coordinate frame may exist in a camera or world coordinate systems for example. A navigation application 118 is embedded in the non-transitory memory 114 and includes a sequence of processor executable instructions to perform the following functions. The navigation application 118 detects a plurality of matching feature points in a first matching image pair, and determines a plurality of corresponding object points in three-dimensional (3D) space from the first image pair. The navigation application 118 tracks the plurality of feature points from the first image pair to a second image pair, and determines the plurality of corresponding object points in 3D space from the second image pair. The navigation application calculates a vehicle pose transformation using the objects points from the first and second image pairs, and determines rotation angle and translation from the vehicle pose transformation. If the rotation angle or translation exceed a minimum threshold, the stored vehicle pose 116 is updated.

The navigation application 118 determines the rotation angle and translation by converting a rotation matrix to a rotation vector, computes the length of the rotation vector to obtain a rotation angle, and computes the length of a 3×1 translation vector to obtain vehicle movement. By only performing vehicle pose updates when the rotation angle or translation exceed the minimum threshold, the accumulation of errors is minimized in vehicle pose transformations calculated between image pairs. In other words, the navigation application 118 discards a current vehicle pose transformation without updating the stored vehicle pose when the rotation angle and translation do not exceed the minimum threshold, but updates the stored vehicle pose with a subsequent vehicle pose transformation in response to the rotation angle or translation exceeding the minimum threshold.

In one aspect, the navigation application 118 converts the vehicle pose into a world coordinate system having a ground plane. The navigation application 118 uses a plane model to find a dominant plane in the 3D space that fits the maximum number of points in an initial image frame, and defines the dominant plane as an estimated ground plane in the world coordinate system. As a result, the navigation application 118 determines vehicle camera height with respect to the estimated ground plane, and camera pitch with respect to the estimated ground plane.

Since the navigation application 118 continuously redefines the estimated ground plane over a plurality of sequential image pairs as the vehicle changes position, it continuously redetermines the camera height and the camera pitch. As a result of redetermining the camera height and camera pitch, a changing ground plane slope does not become defined as an obstacle. However, the navigation application 118 does define the estimated ground plane as invalid when the pitch angle exceeds a pitch angle maximum value. The navigation application 118 has an interface on line 120 to provide drive commands to the vehicle.

The navigation application 118 finds the pitch angle sign as follows:

$$\text{sign} = ((N \otimes M) \cdot V);$$

where N is a vector (0, 1, 0) normal to a plane in the camera coordinate system with y=0;

where M is a vector normal to the estimated ground plane in the camera coordinate system;

where V is a vector along the x axis (1, 0, 0) of the camera coordinate system; and, where $\otimes$ is a symbol representing a cross product operation.

The navigation application 118 removes all points on the estimated ground plane from the 3D space, and defines remaining points in the 3D space as potential obstacles. In one aspect, the navigation application 118 defines the estimated ground plane as points falling within a predetermined translation error and a predetermined rotation error of the points found in the dominant plane.

The system 100 may also include a bus 122, input/output (IO) port 124, and IO port 126. The communication bus 122 may, for example, be a Serial Peripheral Interface (SPI), an Inter-Integrated Circuit (I²C), a Universal Asynchronous Receiver/Transmitter (UART), and/or any other suitable bus or network. Although the drawing implies that the components of the system are essentially collocated in the same device, in some aspects various components may be located outside the device, communicating with other components via a wired or wireless connection.

The memory 114 may include a main memory, a random access memory (RAM), or other dynamic storage devices. These memories may also be referred to as a computer-readable medium. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read. The execution of the sequences of instructions contained in a computer-readable medium (i.e. navigation application 118) may cause the processor 112 to perform some of the steps of autonomous navigation. Alternately, some of these functions may be performed in hardware (not shown). The practical implementation of such a computer system would be well known to one with skill in the art. In one aspect, the processor 112 is an ARM processor using a reduced instruction set computing (RISC) architecture.

The IO ports 124 and 126 may incorporate a modem, an Ethernet card, or any other appropriate data communications device such as USB. The physical communication links (110 and 120) may be optical, wired, or wireless. The system 100 may include a special purpose computing system, and as such, can be programmed, configured, and/or otherwise designed to comply with one or more networking protocols. According to certain embodiments, the system 100 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, IOs 124 and 126 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

The system 100 may provide a direct connection to a remote server (not shown) via a direct wireless link to a network, such as the Internet. Connection may be provided through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, a host adapter is configured to facilitate communication between system 100 and one or more network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like.

Figure 2:
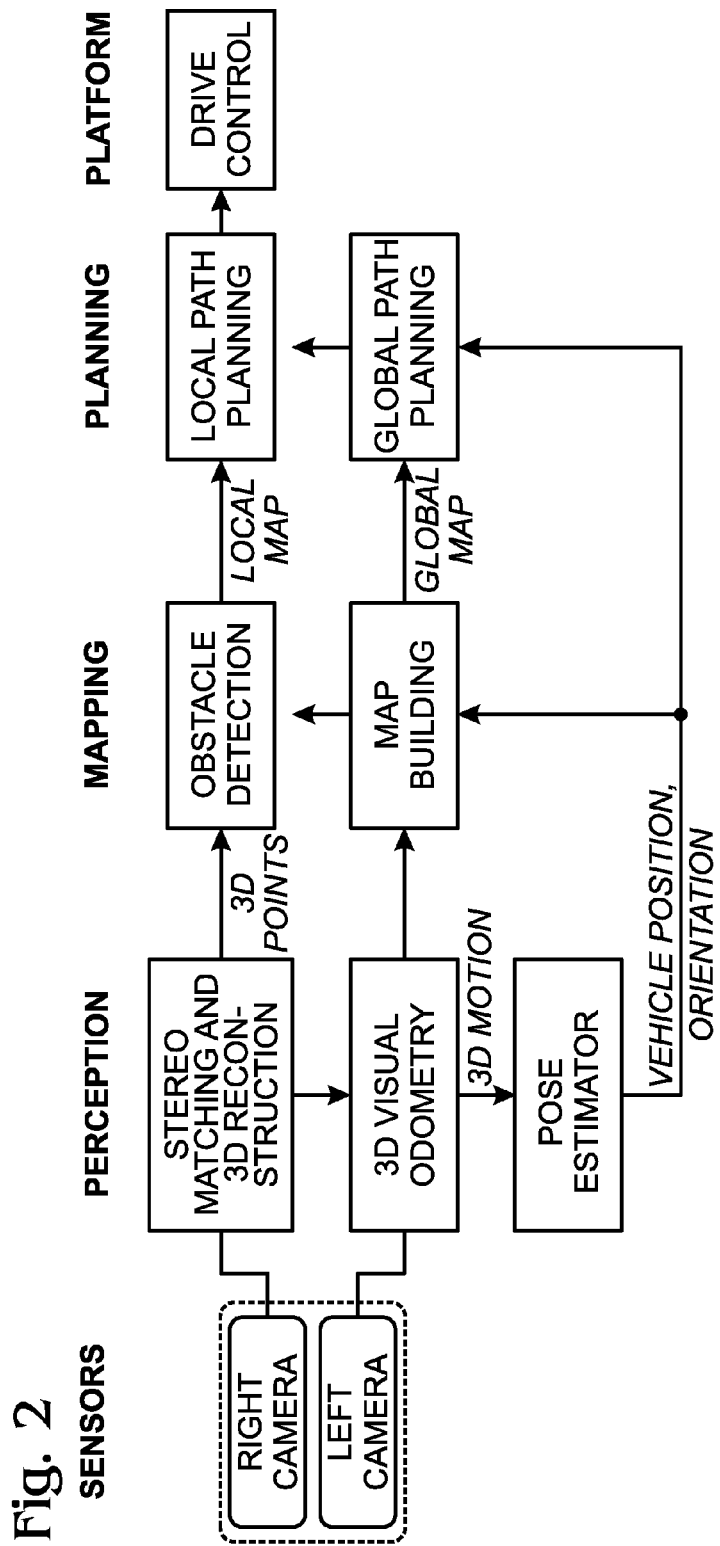
FIG. 2 is a block diagram depicting components of the navigation application.

FIG. 2 is a block diagram depicting components of the navigation application. The visual odometry (VO) method practiced by the navigation system is based on the use of a stereo camera. A stereo camera has the following benefits:
- It provides 3D motion and position, which enables driving on non-planar surfaces
- It doesn't require a fixed camera position and pitch angle with respect to the ground
- The stereo camera can be used for obstacle detection In one exemplary embodiment an adjustable baseline stereo rig was built on top of an Adept pioneer 3DX robot. The stereo rig consisted of 2 point grey Chameleon 1.3 MP color USB 2.0 cameras. Both cameras were set to a manual exposure mode with exactly the same gain value and exposure time. The lens aperture and field of view were also manually tuned to be the same for both cameras. Those two cameras were synchronized to capture 640×480 images at about 20 frames per second (fps).

The robot was equipped with three wheels and took commands from a laptop through USB port. The auto navigation system sent only two types commands to control the robot movement. One command type was to drive at certain speed, and the other one was to turn at certain speed. A negative driving value caused the robot to backup. Positive and negative turning values meant right/left turns, respectively. The robot was capable of reaching speeds of up to 1.6 meters per second and could carry a payload of up to 23 kilograms (kg). The robot was powered by 3 hot-swappable 9 amp-hour (Ah) sealed batteries.

A first step was to obtain the intrinsic and extrinsic parameters of the cameras. Both the camera intrinsic and extrinsic parameters were estimated using the Camera Calibration Toolbox for Matlab. Camera calibration requires capturing multiple images of the calibration pattern in different poses, in order to accurately estimate the intrinsic camera parameters.

When the images from both left and right cameras are received, image distortion introduced by the lenses should be removed. Usually, a wide angle lens has a great deal of distortion close to image boundaries. The lens distortion parameters are contained in the output of the camera calibration, and these distortion parameters can be used to reverse the distortion process and remove the image distortion.

Figure 3:
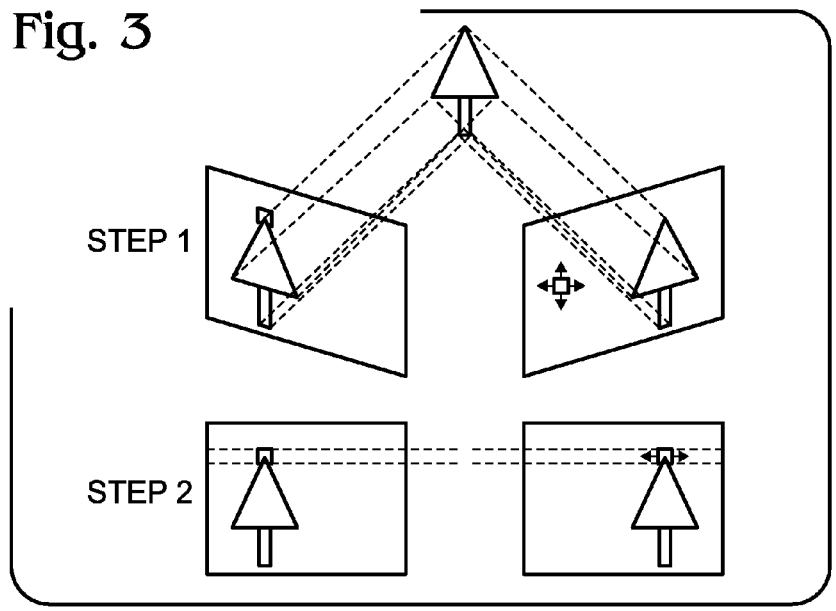
FIG. 3 is a diagram depicting the rectification process.

FIG. 3 is a diagram depicting the rectification process. Since stereo VO involves feature matching between left and right images, it is necessary to rectify left and right image after distortion is removed, to make the same feature point lie on the same horizontal line. By doing this, the feature searching space is reduced from 2D to 1D, largely improving the algorithm efficiency.

As shown in above figure, image rectification involves projecting both the left and right image onto a common image plane. This new image plane is parallel to the line that connects left and right camera center, which guarantees the projections of a scene point are on the same horizontal line on both left and right rectified images. It also guarantees that rectified left and right images have the same intrinsic camera parameters. Once the new image plane is defined, both images are rectified by a homography warping. A homography, also called a projective transform, is a kind of geometric transform like translation, rotation, or affine, but more general. It preserves straight lines, but does not necessarily preserve the angles between lines, or the lengths of line segments.

Figure 4:
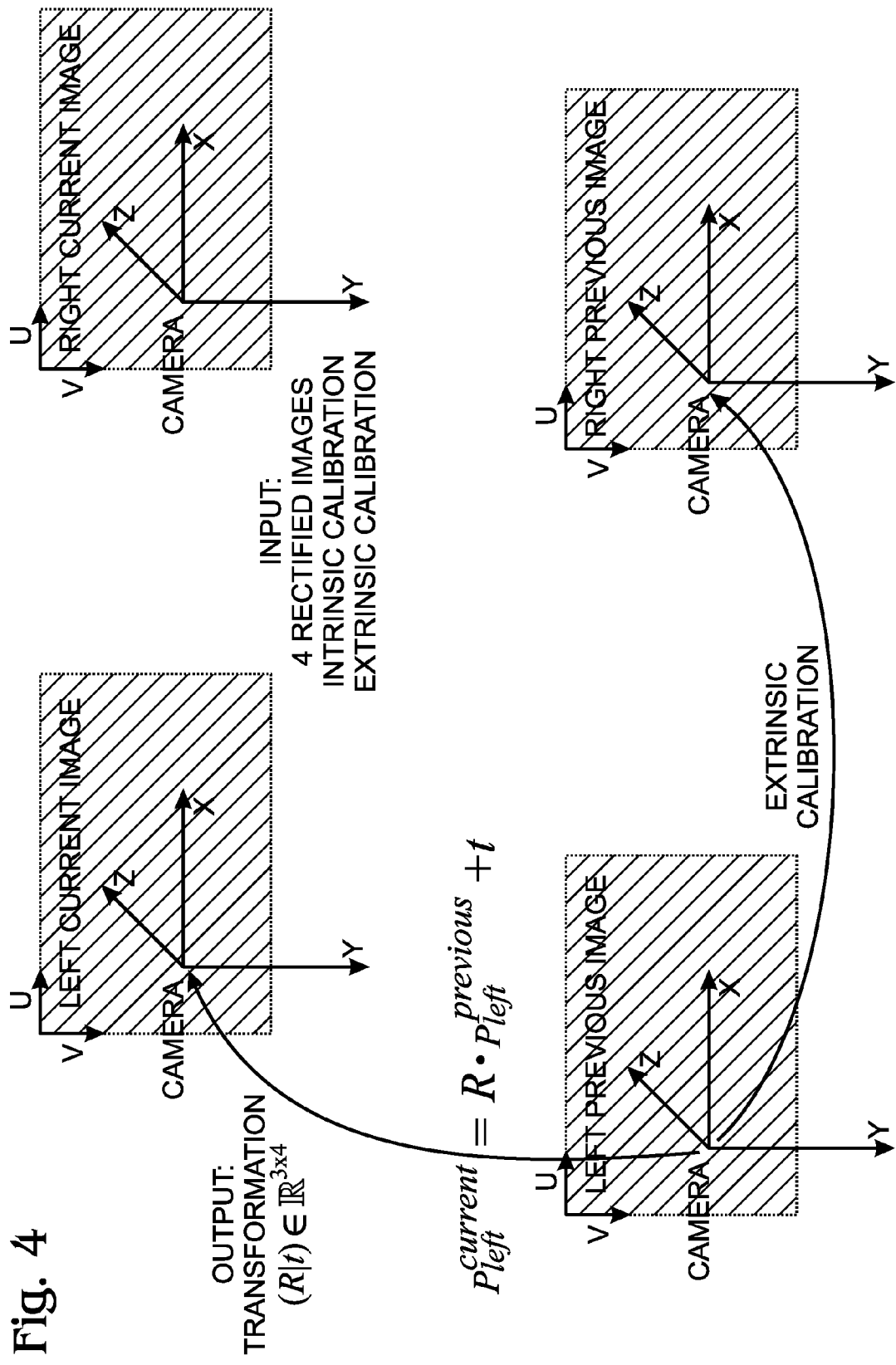
FIG. 4 is a diagram depicting a transformation between two neighboring frames.

FIG. 4 is a diagram depicting a transformation between two neighboring frames. As shown in the figure, two stereo image pairs are used to estimate the robot's movement between time s−1 and time s. First, feature correspondences are established across the four images. The four images are the left and right images at time s−1, and the left and right images at time s. Feature matches between left and right images are used to reconstruct the 3D positions (object points) of those features in the scene. For the same set of feature points, their 3D positions can be found at both time s−1 and time s. Under the assumption of rigid body transformation, the transformation of those 3D points is actually the inverse of the robot transformation.

The rigid transformation (rotation R and translation t) of those 3D points is estimated by minimizing the following term in the least squares sense:

$$\sum_{i=1}^{n} \|Rp_{i,s-1} + t - p_{i,s}\|$$

The total number of 3D points is assumed to be n. $p_{i,s-1}$ and $p_{i,s}$ are 3D positions of point p at time s−1 and s, respectively. If the coordinate system is defined at center of left camera, the 3D position of feature points can be easily obtained once left and right image are rectified:

$$z = \frac{fB}{d}, x = \frac{uz}{f}, y = \frac{vz}{f}$$

Here, f is camera focal length, B is baseline of left and right cameras (distance between the cameras), d is disparity of the feature in left and right images. [u, v] is 2D coordinate of the feature on left image.

Since the transformation of 3D point is the inverse of that of robot, the robot transformation ($R_s$ and $t_s$) is obtained by:

$$R_s = R^{-1}, t_s = -R^{-1}t$$

In order to estimate the current pose of robot, the frame-to-frame transformations are accumulated from a known starting point. If it can be assumed that the pose of the first frame is world origin [0, 0, 0], then the pose of robot at time s can be obtained by following equation:

$$\begin{bmatrix} O_s & P_s \\ 0 & 1 \end{bmatrix} = \begin{bmatrix} R_s & t_s \\ 0 & 1 \end{bmatrix} * \begin{bmatrix} O_{s-1} & P_{s-1} \\ 0 & 1 \end{bmatrix}$$

Here $O_{s-1}$ is a 3×3 matrix recording robot orientation at time s−1, and $P_{s-1}$ is a 3×1 vector recording 3D position of the robot at time s−1.

The VO algorithm may suffer from drift after the robot travels a long distance because error is also accumulated when frame-to-frame transformations are concatenated. In order to minimize the drift, the number of frames used for VO estimation can be minimized. That means that the neighboring frames are kept as distant as possible, without losing feature tracking. The distance is computed between two neighboring frames from $t_s$, which is the translation of the camera center in 3D space. The rotation angle is computed from $R_s$. $R_s$ is first converted to a rotation vector using Rodrigues algorithm. The normal of the result vector is the rotation angle that is used. In one aspect, if the normal of $t_s$ is less than 5 centimeters (cm) or if the rotation angle of $R_s$ is less than 5 degrees, the current frame is dropped and a new frame is captured to calculate robot transformation from a previous frame.

Up to this point, the result robot pose is defined in the coordinate system of left camera. In particular, the coordinate system origin coincides with the camera center of left camera when it captures the first frame. The z axis of the coordinate system is aligned with the direction in which the camera is sighted ("looking"). This alignment may cause some issues when the camera sighting direction is not parallel to the ground. In order to measure the distance traveled on the ground, the robot pose must be transformed into a coordinate system that is parallel to the ground.

One method of defining a world coordinate system is to use a calibration target (e.g., a checkerboard). The checkerboard is aligned perpendicular to the ground, so that its x and z axes are both parallel to the ground. Once the robot pose is obtained in camera's coordinate system, the pose is transformed into the world coordinate system and then projected onto the xz plane to obtain the distance traveled on the ground. The transformation between camera coordinate system and world coordinate system can be obtained through camera calibration process that aligns the cameras with the calibration target.

Alternatively, the robot pose can be transformed into the world (ground) coordinate system by directly estimating the ground plane from the 3D points reconstructed by the stereo camera. Once the ground plane is estimated, a new coordinate system is defined on that plane, and the robot pose is transformed into this new coordinate system. In the obstacle detection module, the ground plane estimation runs repetitively at a certain frequency as robot moves, in order to dynamically adjust the relative angle and height of the cameras with respect to the ground. However, for the robot pose transformation, the only requirement is the ground plane when robot starts. Therefore, whenever the robot starts, the plane observed by the robot is estimated and used to define the world coordinate system. A description of ground plane estimation is provided in greater detail below.

In autonomous navigation systems, accurate and fast obstacle detection is a major concern. Conventionally, laser scanners are still very widely used for this purpose, mainly because they directly provide 3D measurements. However, they are often expensive and difficult to integrate into hardware designs. Using cameras for vision based obstacle detection provides a more economical solution while achieving a reasonably good detection result. Classical computer vision techniques such as appearance-based object detection are limited in application because of the large amount of noise in the reflectance measurements. Stereo vision has gained popularity in object detection because it can obtain accurate depth information, which allows obstacle detection to be performed with less noise.

The navigation and obstacle detection methods used in the system described herein are based upon two assumptions that are reasonable in terms of the robot and automobile application. First, the cameras are pre-calibrated and are mounted on a platform with known pitch angle and height to the ground plane. Second, the cameras have a smooth trajectory which can avoid heavy computation related to rotation, scale invariant feature descriptors. These assumptions permit the projection between the world coordinate system, the camera coordinate system, and the image plane.

A first step is dense stereo matching. It starts with computing disparities of a small set of points that can be robustly matched due to texture and uniqueness. The image coordinates of this set of points are then used to create a 2D mesh via Delaunay triangulation. To increase algorithm efficiency, the input images are rectified so that matching point can be found at the epipolar line of each point, if there is one. Using the disparity map, 3D coordinates can be calculated with the camera matrix from calibration. Given focal length f, principle point [$x_c$, $y_c$], and baseline B, the 3D coordinates of a matched point in camera coordinate system can be computed by the following equations:

$$X_c = \frac{Z_c(x - x_c)}{f}$$

$$Y_c = \frac{Z_c(y - y_c)}{f}$$

$$Z_c = \frac{fB}{d}$$

With the [$X_c$, $Y_c$, $Z_c$] coordinates in the camera coordinate system, points can be projected to world coordinate system using the extrinsic camera matrix as follows:

$$\begin{bmatrix} X_w \\ Y_w \\ Z_w \\ 1 \end{bmatrix} = \begin{bmatrix} R & t \\ 0 & 1 \end{bmatrix} \begin{bmatrix} X_c \\ Y_c \\ Z_c \\ 1 \end{bmatrix} = \begin{bmatrix} 1 & 0 & 0 & 0 \\ 0 & \cos\theta & -\sin\theta & -h \\ 0 & \sin\theta & \cos\theta & 0 \\ 0 & 0 & 0 & 1 \end{bmatrix} \begin{bmatrix} X_c \\ Y_c \\ Z_c \\ 1 \end{bmatrix}$$

where θ is the pitch angle of the cameras facing down, and h is the height of the cameras from the ground plane.

Ground plane estimation is a technique used by autonomous ground vehicles to estimate the height and pitch of a camera relative to the driving surface. Ground plane estimation is an important component leading to improved vision-based obstacle detection.

Figure 5:
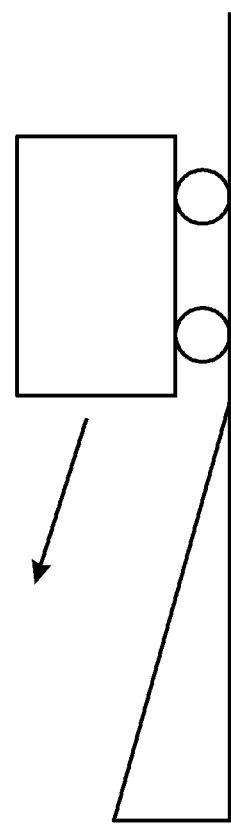
FIG. 5 is a diagram of a robot encountering a sloped ground plane.

FIG. 5 is a diagram of a robot encountering a sloped ground plane. Some conventional obstacle detection algorithms developed for mobile robotics are based on the assumption that the road is flat, without slopes. This assumption is valid in many indoor and outdoor environments. However, more often than not, the robot encounters road conditions such as hills, slopes, etc. In such a case (as shown), the assumption of a fixed camera pitch angle and camera height leads to the false detection of the slope as an obstacle, and leads to false decisions in obstacle avoidance. That is, the robot identifies the slope surface as an obstacle simply because the slope rises from the ground. This assumption is caused by the use of a fixed pitch angle. In the process of stereo camera calibration, the pitch angle is measured as the angle between the camera and a flat ground plane. When the robot approaches the slope, the ground rises and the pitch angle appears to change. If the robot uses the calibrated pitch angle, the sloped ground is detected by the robot as an obstacle.

In order to avoid false detections caused by the change of road conditions, the correct camera pitch angles are robustly corrected from the scene, thus eliminating false alarms. This method utilizes the RANdom SAmpling Consensus (RANSAC) algorithm to estimate the ground plane, and uses the ground plane to adjust camera pose information.

The RANSAC algorithm is a classic iteration algorithm to remove outliers from a defined model. Here, the model is a plane model of the ground surface. Instead of removing outliers, the model parameters of the inliers are estimated. The model parameters are the four coefficients in the plane equation:

$$aX+bY+cZ+d=0$$

The RANSAC algorithm outputs a set of coefficients that fits most points in the scene. In the case of a robot-mounted camera, the dominant plane is most likely the ground plane. Using this observation, the ground plane is estimated, and the pitch angle and height of the camera are corrected.

Figure 6:
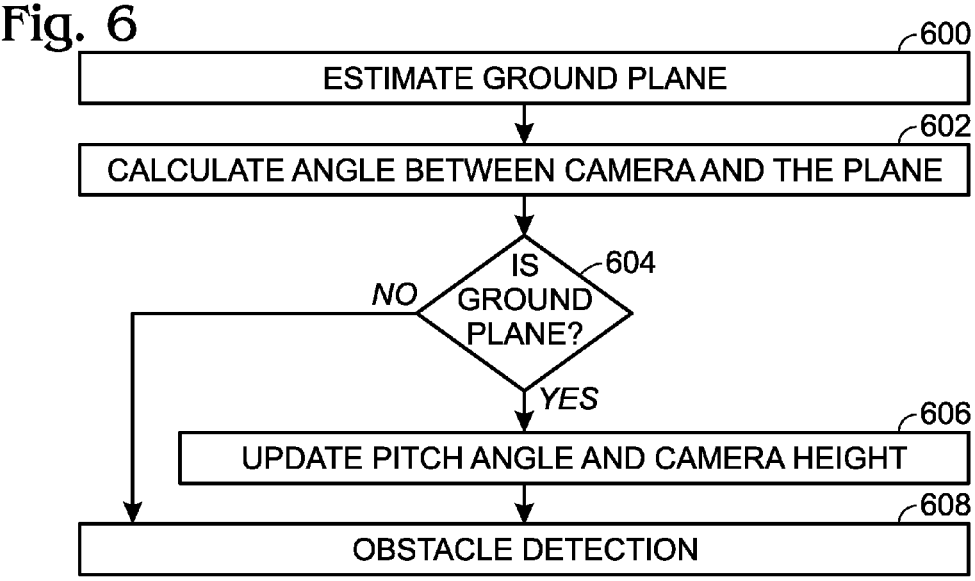
FIG. 6 is a flowchart illustrating the basic steps of using ground plane estimation for obstacle detection.

FIG. 6 is a flowchart illustrating the basic steps of using ground plane estimation for obstacle detection. The method starts at Step 600. The input for the algorithm is the point cloud generated from the disparity map. The RANSAC algorithm in the Point Cloud Library (PCL) is used to estimate the ground plane. With the coefficients, Step 602 calculates the angle between the estimated ground plane and the plane at y=0. The angle is the indication of pitch angle. Step 604 is a "sanity check" conducted to make sure that the estimated plane is indeed the ground plane. If the estimated angle is larger than $\pi/4$, for example, then the plane is considered as a non-ground plane. Thus, the method skips to the detection part (Step 606) without updating the pitch angle and height. Otherwise, the pitch angle and height are updated in Step 608.

When updating the pitch angle and camera height, one extra step may be applied. The angle calculation is based on the normal vector angles of the two planes. Thus, it is not a signed angle. However, in the process of projecting the points into the world coordinate system, the pitch angle needs to be signed properly, since there is a possibility that the cameras are tilted up away from the ground instead of facing down towards the ground. So, the extra step identifies the sign of the pitch angle.

Here, the cross product of normal vectors is used to determine the sign of the angle. Let N=[0, 1, 0]' be the normal vector of the plane y=0; M be the normal vector of the estimated plane; and V=[1, 0, 0]' be the vector along x axis. The sign is then determined by the equation:

$$SGN = \text{sign}((N \otimes M) \cdot V)$$

With an updated pitch angle and camera height, the detected point clouds are then ready to be projected into the world coordinate system for further processing (to detect and avoid potential obstacles).

After estimating the pitch angle and height of ground plane, it's straight forward to remove those 3D points on ground plane. However, two factors could affect the reliability of ground point removal. First, the 3D position estimation from stereo camera could introduce some errors, which means those points on the ground don't necessarily lie on the y=0 plane. Therefore, a range around y=0, [−t, t] can be defined. When a point distance to the y=0 plane falls into within this range, it is taken as a ground point and removed.

Second, the estimated pitch angle θ could also introduce error. This error could result in misalignment of the ground plane with the y=0 plane after the 3D points are transformed into the world coordinate system. In most cases, the ground plane intersects with y=0 plane, where the 3D points have their y coordinate equal to 0, while all other points on the ground plane have either positive or negative y values. In order to deal with this problem, again, a range [θ−δ, θ+δ] can be set around the estimated pitch angle θ, and the 3D points transformed by both the upper and lower bounds of the pitch range. Each 3D point has an upper and lower bounds [y1, y2] for its y value after the camera-to-world transformation. The height of the 3D point falls into that range as long as the true pitch angle is bounded into [θ−δ, θ+δ]. Instead of finding the distance of a 3D point to the y=0 plane, the distance of the range [y1, y2] to the y=0 plane is found. The distance of range [y1, y2] to the y=0 plane is defined as:

$$d = \begin{cases} y1 & \text{if } 0 < y1 \\ -y2 & \text{if } y2 < 0 \\ 0 & \text{if } y1 \le 0 \le y2 \end{cases}$$

d is actually the potential minimum distance of a 3D point to the y=0 plane. At this point, all the d 3D points for which d falls into [−t, t] are ground points, and are removed. This leads to more robust removal of ground points.

The remaining 3D points are then projected into an occupancy grid. An occupancy grid is a 2D grid map with each grid cell representing a column in the 3D space. That is, each grid cell represents points anywhere in a vertical column standing on the ground. In most cases, the ground plane is parallel to the occupancy grid plane. Points are projected to the xy plane and into different cells on the grid map based on their location. A cell is considered as occupied once the number of points in the cell reaches a pre-defined threshold. Finally, those occupied grid cells are clustered together into individual obstacles.

Path planning for obstacle avoidance is another function in vision-based robot navigation. A path planner provides the ability for a robot to avoid obstacles and regenerate a path to the goal. If a map is given and obstacles are static, it is not difficult for the robot to find a path to reach the goal without obstacle collision. However, in unknown environments with dynamic obstacles, it is a challenging task for the robot to find a path toward the goal while avoiding obstacles. Particularly, it becomes difficult for the robot with a finite range sensor to avoid obstacles and regenerate the path since the robot cannot detect obstacles out of the finite range.

Figure 7:
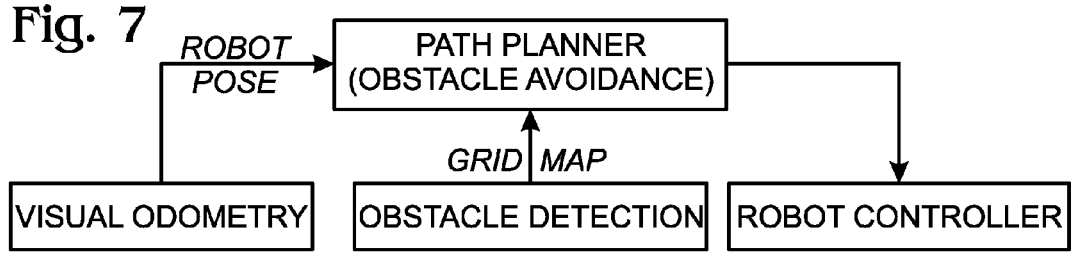
FIG. 7 is a diagram depicting an overview of a path planner for obstacle avoidance.

FIG. 7 is a diagram depicting an overview of a path planner for obstacle avoidance. The path planner uses only visual inputs from a stereo camera to avoid static and dynamic obstacles in unknown environments. The path planner uses VO and obstacle detection (OD) as presented above. VO provides the robot pose for the path planner to localize the robot in the world coordinate system. OD generates an occupancy grid map which is used for the path planner to detect obstacles. For example, a Tangent Bug (TB) algorithm may be used as a path planner. Other path planning techniques that may be used include A* or C* search-based methods, or probabilistic path planning methods.

Figure 8:
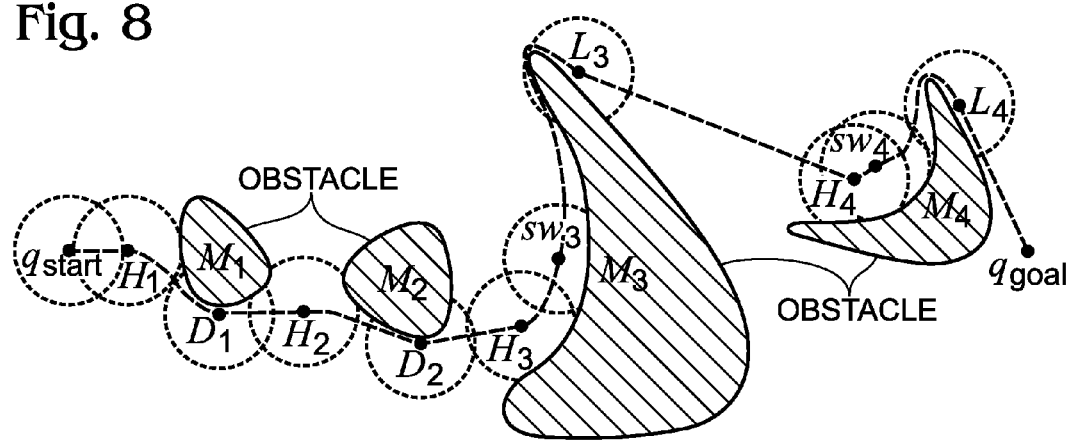
FIG. 8 is a diagram of a robot using Tangent Bug algorithm to bypass obstacles.

FIG. 8 is a diagram of a robot using a Tangent Bug algorithm to bypass obstacles. TB is capable of finding the shortest path to the goal when a robot has a finite range sensor. TB has two basic behaviors: 1) moving toward the goal; and, 2) following the boundary of a concave obstacle. When the robot encounters obstacles (M), TB finds a waypoint (H), which minimizes the travel path to the goal. In addition, TB can follow the boundary of a concave obstacle (e.g., M3) until it "clears" that obstacle and can resume a path toward the goal point.

Figure 9:
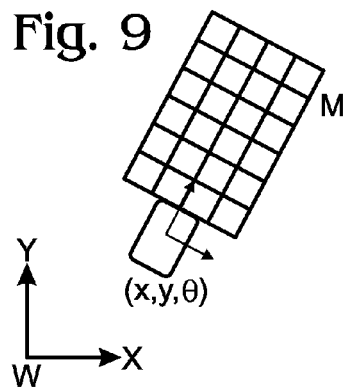
FIG. 9 is a diagram depicting a world coordinate system and an occupancy (2D) grid in the robot's coordinate system.

FIG. 9 is a diagram depicting a world coordinate system and an occupancy (2D) grid in the robot's coordinate system. TB can be described as using Algorithms 1, 2, and 3 below. Whenever a new image pair (i.e., left and right images) is obtained from a stereo camera, TB computes a robot pose using VO and generates an occupancy grid map using OD (Line 3 and 4 in Algorithm 1). In 2D environments, a robot pose can be parameterized as z=[x, y, θ], where [x, y] is the translation and θ is the orientation in the world coordinate W. The occupancy grid map can be presented as M={$m_1, m_2, \ldots, m_n$}, where $m_n$ is the $n^{th}$ grid cell in the robot coordinate. In the occupancy grid map, each cell has 1 or 0. If a cell is occupied by obstacles, it has 1. Otherwise, the cell has 0.

If the occupancy grid map has obstacles (Line 6-8 in Algorithm 1), TB finds a waypoint n which minimizes the following cost function:

$$h(x,n)=d(x,n)+d(n,g)$$

where d(n, g) is the Euclidean distance between a waypoint n and the goal g. d(x, n) is the Euclidean distance between the current robot location x and a waypoint n. Waypoints $N=\{n_1, n_2, \ldots, n_k\}$ are selected by Algorithm 2. n is selected among unoccupied grid cells around the occupied grid cells. If there are no unoccupied grid cells in the nearest row of the map, the right location of the most right occupied grid cell in the nearest row is selected as a waypoint because it is assumed that the area out of the grid map is obstacle-free.

If the cost function h(x, n) increases, TB begins to follow the boundary of a concave obstacle (Line 9, 16 in Algorithm 1). In the boundary following algorithm (Algorithm 3), TB continues to follow the boundary of the concave obstacle and updates $d_{reach}$ and $d_{followed}$, where $d_{reach}$ is the shortest distance between the robot and the goal and $d_{followed}$ is the shortest distance between the sensed boundary and the goal, respectively (Line 1-2 in Algorithm 3). If $d_{reach}<d_{followed}$, TB terminates the boundary following (Line 3-4 in Algorithm 3) and moves the robot toward the goal.

Figure 10A:
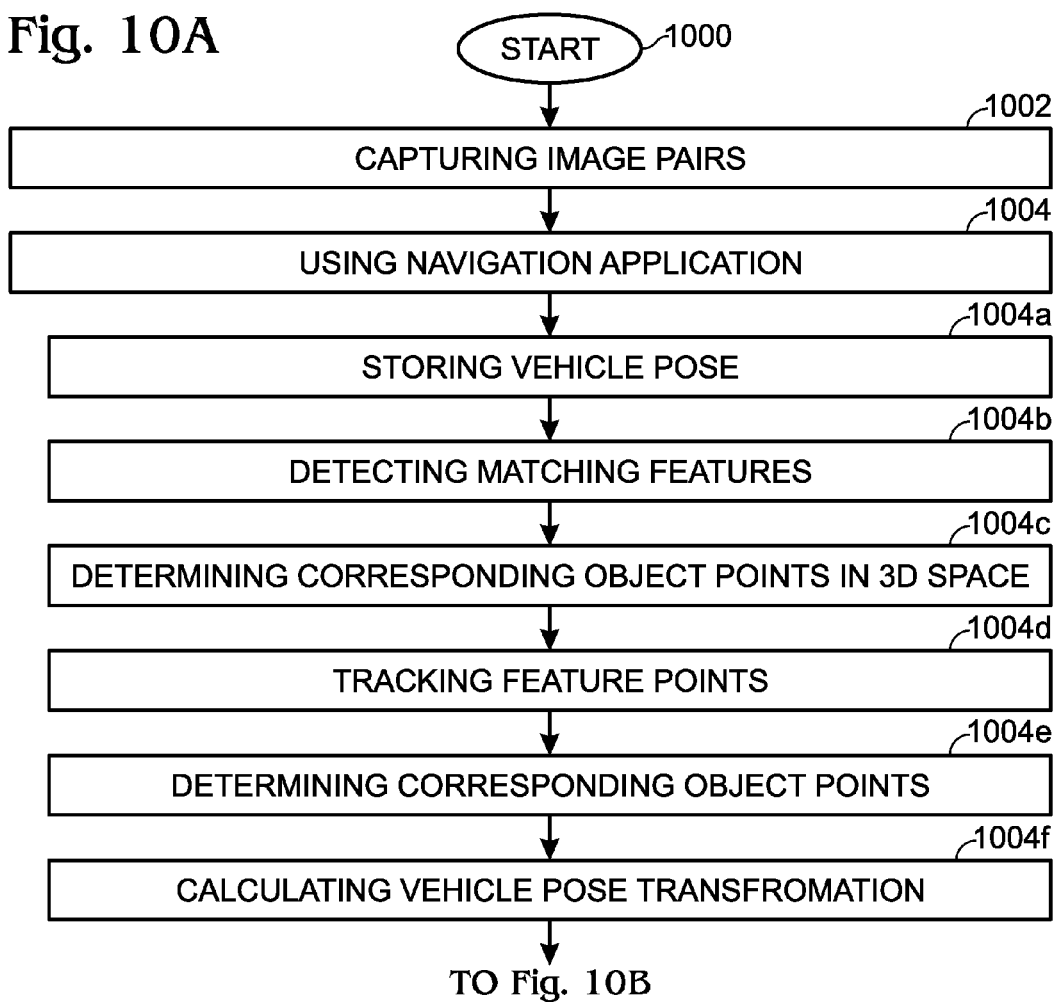
FIGS. 10A and 10B are flowcharts illustrating a method for autonomously navigating a vehicle.
Figure 10B:
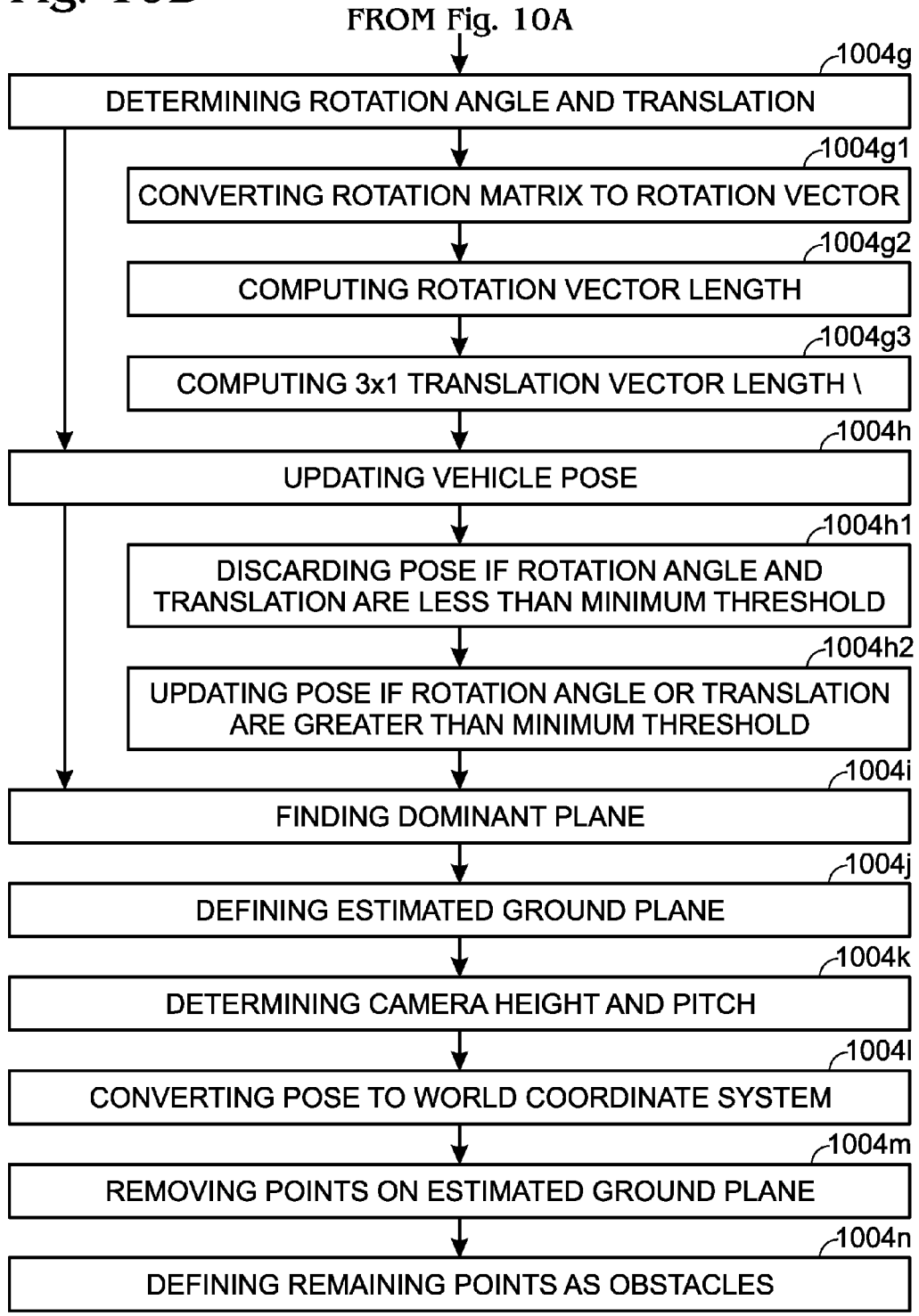

---
Algorithm 1 Tangent_Bug
---
1: Set boundary_following_mode off.
2: while Goal is not reached do
3:     Compute a robot pose by using Visual Odometry
4:     Compute an occupancy grid map by using Obstacle Detection
5:     if boundary_following_mode is off then
6:         if Obstacles are detected then
7:             Select_waypoints(occupancy_grid_map)
8:             Select a waypoint n minimizing h(x, n) = d(x, n) + d(n, g)
9:             Move a robot toward a waypoint n
10:            if h(x, n) begins to increase then
11:                Set boundary_following_mode on
12:            end if
13:        else
14:            Move a robot toward the goal.
15:        end if
16:    else
17:        Boundary_following(occupancy_grid_map)
18:    end if
19: end while ---
Algorithm 2 Select_waypoints(occupancy_grid_map)
---
1: for Each grid cell in obstacles do
2:     if The left grid cell is free space then
3:         Add the left grid cell into waypoints
4:     else if The right grid cell is free space then
5:         Add the right grid cell into waypoints
6:     end if
7: end for
8: if All grid cells in the nearest row are obstacles then
9:     Add the right grid cell of the most right grid cell into waypoints
10: end if
11: return waypoints ---
Algorithm 3 Boundary_following(occupancy_grid_map)
---
1: Move a robot along the boundary in same direction as before repeating
2: Update $d_{reach}$ and $d_{followed}$
3: if $d_{reach} < d_{followed}$ then
4:     Set boundary_following_mode off.
5: end if FIGS. 10A and 10B are flowcharts illustrating a method for autonomously navigating a vehicle. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1000.

Step 1002 captures a sequence of image pairs using a stereo camera. In Step 1004 a navigation application embedded in a non-transitory memory uses a sequence of processor executable instructions for the following substeps. Step 1004a stores a vehicle pose, where a vehicle pose is defined herein as a position and orientation with respect to a coordination frame. Alternatively, a vehicle pose may be understood to be an accumulation of pose changes/pose transformations. Step 1004b detects a plurality of matching feature points in a first matching image pair. Step 1004c determines a plurality of corresponding object points in 3D space from the first image pair. Step 1004d tracks the plurality of feature points from the first image pair to a second image pair. Step 1004e determines a plurality of corresponding object points in 3D space from the second image pair. Step 1004f calculates a vehicle pose transformation using the object points from the first and second image pairs. Step 1004g determines rotation angle and translation from the vehicle pose transformation.

If the rotation angle or translation exceed a minimum threshold, Step 1004h updates the stored vehicle pose. As a result, Step 1004h minimizes the accumulation of errors in vehicle pose transformations calculated between image pairs. That is, Step 1004h discards a vehicle transformation when the rotation angle and translation do not exceed the minimum threshold. More explicitly, Substep 1004h1 discards a current vehicle pose transformation, and fails to update the stored vehicle pose, when the rotation angle and translation do not exceed the minimum threshold. Substep 1004h2 updates the stored vehicle pose with a subsequent vehicle pose transformation in response to the rotation angle or translation exceeding the minimum threshold.

In one aspect, determining the rotation angle and translation from the vehicle pose transformation in Step 1004g includes the following substeps. Step 1004g1 converts a rotation matrix to a rotation vector. Step 1004g2 computes the length of the rotation vector to obtain a rotation angle. Step 1004g3 computes the length of a 3×1 translation vector to obtain vehicle movement.

In another aspect, Step 1004i uses a plane model to find a dominant plane in the 3D space that fits the maximum number of points in an initial image frame. Step 1004j defines the dominant plane as an estimated ground plane in a world coordinate system. By defining the estimated ground plane, Step 1004k determines the vehicle camera height with respect to the estimated ground plane and camera pitch with respect to the estimated ground plane. Step 1004l converts the vehicle pose into the world coordinate system having a ground plane. In one aspect, Step 1004k continuously redefines the estimated ground plane over a plurality of sequential image pairs as the vehicle changes position, so that Step 1004*l* continuously redetermines the camera height and the camera pitch. In response to redetermining the camera height and camera pitch, Step 1004*n* avoids the definition of a changing ground plane slope as an obstacle. In one aspect, Step 1004*k* defines an estimated ground plane as points falling within a predetermined translation error and a predetermined rotation error of the points found in the dominant plane.

In another aspect, continuously redetermining the camera height and the camera pitch in Step 1004*l* includes defining the estimated ground plane as invalid with the pitch angle exceeds a pitch angle maximum value. Further, continuously redetermining the camera height and the camera pitch may include finding the pitch angle sign as follows:

$$\text{sign}=((N \otimes M) \cdot V);$$

where N is a vector (0, 1, 0) normal to a plane in the camera coordinate system with y=0;

where M is a vector normal to the estimated ground plane in the camera coordinate system;

where V is a vector along the x axis (1, 0, 0) of the camera coordinate system; and, where $\otimes$ is a symbol representing a cross product operation.

Step 1004*m* removes all points on the estimated ground plane from the 3D space, and Step 1004*n* defines remaining point in the 3D space as potential obstacles.

A system and method have been provided for autonomous navigation. Examples of particular processes and hardware units have been presented to illustrate the invention. However, the invention is not limited to merely these examples. Other variations and embodiments of the invention will occur to those skilled in the art.

We claim:

1. A method for autonomously navigating a vehicle, the method comprising:
    capturing a sequence of image pairs using a stereo camera;
    providing a navigation application embedded in a non-transitory memory including a sequence of processor executable instructions for:
        storing a vehicle pose, where a vehicle pose is defined as a position and orientation with respect to a coordination frame;
        detecting a plurality of matching feature points in a first matching image pair;
        determining a plurality of corresponding object points in three-dimensional (3D) space from the first image pair;
        using a plane model, finding a dominant plane in the 3D space that fits the maximum number of points in the first image pair;
        defining the dominant plane as an estimated ground plane in a world coordinate system;
        in response to defining the estimated ground plane, determining vehicle camera height with respect to the estimated ground plane and camera pitch with respect to the estimated ground plane;
        continuously redefining the estimated ground plane over a plurality of sequential image pairs as the vehicle changes position; wherein determining the camera height and camera pitch includes continuously redetermining the camera height and the camera pitch, such redetermining including avoiding the definition of a changing ground plane slope as an obstacle and finding the pitch angle sign as follows:

$$\text{sign}=((N \otimes M) \cdot V);$$

where N is a vector (0, 1, 0) normal to a plane in the camera coordinate system with y =0;

where M is a vector normal to the estimated ground plane in the camera coordinate system;

where V is a vector along the x axis (1, 0, 0) of the camera coordinate system;

where $\otimes$ is a symbol representing a cross product operation;

tracking the plurality of feature points from the first image pair to a second image pair;

determining a plurality of corresponding object points in 3D space from the second image pair;

calculating a vehicle pose transformation using the object points from the first and second image pairs;

determining rotation angle and translation from the vehicle pose transformation; and, when the rotation angle or translation exceed a minimum threshold, updating the stored vehicle pose.

2. The method of claim 1 wherein determining the rotation angle and translation from the vehicle pose transformation includes:
    converting a rotation matrix to a rotation vector;
    computing a length of the rotation vector to obtain a rotation angle; and,
    computing a length of a 3×1 translation vector related to the captured image pairs to obtain vehicle movement.

3. The method of claim 1 wherein updating the stored vehicle pose when the rotation angle or translation exceed the minimum threshold includes minimizing the accumulation of errors in vehicle pose transformations calculated between image pairs.

4. The method of claim 3 wherein updating the stored vehicle pose when the rotation angle or translation exceed the minimum threshold includes discarding a vehicle transformation when the rotation angle and translation do not exceed the minimum threshold.

5. The method of claim 4 wherein updating the stored vehicle pose when the rotation angle or translation exceed the minimum threshold includes:
    discarding a current vehicle pose transformation, and failing to update the stored vehicle pose, when the rotation angle and translation do not exceed the minimum threshold; and
    updating the stored vehicle pose with a subsequent vehicle pose transformation in response to the rotation angle or translation exceeding the minimum threshold.

6. The method of claim 1 further comprising:
    converting the vehicle pose into the world coordinate system having a ground plane.

7. The method of claim 1 wherein continuously redetermining the camera height and the camera pitch includes defining the estimated ground plane as invalid when the pitch angle exceeds a pitch angle maximum value.

8. The method of claim 1 further comprising:
    removing all points on the estimated ground plane from the 3D space; and,
    defining remaining points in the 3D space as potential obstacles.

9. The method of claim 1 wherein defining the estimated ground plane includes defining an estimated ground plane as points falling within a predetermined translation error and a predetermined rotation error of the points found in the dominant plane.

10. A system for autonomously navigating a vehicle, the system comprising:
- a vehicle;
- a stereo camera mounted on the vehicle having an output to supply image pairs, each image pair including a right image and a left image;
- a processor;
- a non-transitory memory comprising:
  - a stored vehicle pose, where a vehicle pose is defined as a position and orientation with respect to a coordination frame;
  - a navigation application embedded in the non-transitory memory including a sequence of processor executable instructions, the navigation application detecting a plurality of matching feature points in a first matching image pair, determining a plurality of corresponding object points in three-dimensional (3D) space from the first image pair, tracking the plurality of feature points from the first image pair to a second image pair, determining the plurality of corresponding object points in 3D space from the second image pair, calculating a vehicle pose transformation using the objects points from the first and second image pairs, determining rotation angle and translation from the vehicle pose transformation, and updating the stored vehicle pose when the rotation angle and translation exceed a minimum threshold;
- wherein the navigation application:
  - converts the vehicle pose into a world coordinate system having a ground plane;
  - uses a plane model to find a dominant plane in the 3D space that fits the maximum number of points in an initial image frame, and defines the dominant plane as an estimated ground plane in the world coordinate system; and
  - finds a pitch angle sign of the camera as follows:

$$\text{sign} = ((N \otimes M) \cdot V);$$

- where N is a vector (0, 1, 0) normal to a plane in the camera coordinate system with y=0;
  - where M is a vector normal to the estimated ground plane in the camera coordinate system;
  - where V is a vector along the x axis (1, 0, 0) of the camera coordinate system; and,
  - where $\otimes$ is a symbol representing a cross product operation.

11. The system of claim 10 wherein the navigation application determines the rotation angle and translation by converting a rotation matrix to a rotation vector, computing a length of the rotation vector to obtain a rotation angle, and computing a length of a 3×1 translation vector related to the captured image pairs to obtain vehicle movement.

12. The system of claim 10 wherein the navigation application minimizes the accumulation of errors in vehicle pose transformations calculated between image pairs.

13. The system of claim 12 wherein the navigation application discards a current vehicle pose transformation without updating the stored vehicle pose, when the rotation angle or translation do not exceed the minimum threshold, and updates the stored vehicle pose with a subsequent vehicle pose transformation in response to the rotation angle and translation exceeding the minimum threshold.

14. The system of claim 10 wherein the navigation application determines vehicle camera height with respect to the estimated ground plane, and camera pitch with respect to the estimated ground plane.

15. The system of claim 10 wherein the navigation application continuously redefines the estimated ground plane over a plurality of sequential image pairs as the vehicle changes position, continuously redetermines the camera height and the camera pitch, and in response to redetermining the camera height and camera pitch, avoids the definition of a changing ground plane slope as an obstacle.

16. The system of claim 10 wherein the navigation application defines the estimated ground plane as invalid when the pitch angle exceeds a pitch angle maximum value.

17. The system of claim 10 wherein the navigation application removes all points on the estimated ground plane from the 3D space, and defines remaining points in the 3D space as potential obstacles.

18. The system of claim 10 wherein the navigation application defines the estimated ground plane as points falling within a predetermined translation error and a predetermined rotation error of the points found in the dominant plane.

* * * * *